(12) United States Patent
Supalov

(10) Patent No.: US 8,305,883 B2
(45) Date of Patent: Nov. 6, 2012

(54) TRANSPARENT FAILOVER SUPPORT THROUGH PRAGMATICALLY TRUNCATED PROGRESS ENGINE AND REVERSED COMPLEMENTARY CONNECTION ESTABLISHMENT IN MULTIFABRIC MPI IMPLEMENTATION

(75) Inventor: Alexander V. Supalov, Erftstadt (DE)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 12/383,237

(22) Filed: Mar. 20, 2009

(65) Prior Publication Data

US 2010/0238796 A1    Sep. 23, 2010

(51) Int. Cl.
*H04J 1/16* (2006.01)

(52) U.S. Cl. .............. 370/225; 370/395.2; 370/437

(58) Field of Classification Search .......... 370/216, 370/225, 217, 218, 351, 389, 395.1, 396, 370/398, 422; 398/43, 45, 48, 50; 709/223
See application file for complete search history.

(56) References Cited

U.S. PATENT DOCUMENTS

| | | | |
|---|---|---|---|
| 2006/0146715 A1 | 7/2006 | Supalov | |
| 2006/0221933 A1* | 10/2006 | Bauer et al. | 370/352 |
| 2007/0097952 A1 | 5/2007 | Truschin | |
| 2007/0253328 A1* | 11/2007 | Harper et al. | 370/219 |
| 2008/0077916 A1 | 3/2008 | Supalov | |
| 2008/0117884 A1* | 5/2008 | Ishii et al. | 370/338 |
| 2009/0063444 A1* | 3/2009 | Arimilli et al. | 707/5 |

OTHER PUBLICATIONS

A Message-Passing Interface Standard Version 2.1, Message Passing Interface Forum, Jun. 23, 2008, available at www.mpi-forum.org/docs/.

* cited by examiner

*Primary Examiner* — Obaidul Huq
(74) *Attorney, Agent, or Firm* — Barre Law Firm, PLLC

(57) ABSTRACT

A method, system, and computer program product containing instructions for establishing and maintaining multiple connections over different communication fabrics between two processes. The slowest, most reliable connection may be established first and then complemented by progressively faster connections between the same pair of processes. Each of these multiple connections is maintained throughout the duration of the communication session between the processes. These multiple connections may include connections made via network interfaces and, when available, direct connections such as a shared memory connection or a point-to-point processor interconnection. This connection strategy provides one or more failback communication paths that can be used with no startup costs in the event of failure of one of the other communication paths. These failback communication paths can be used to exchange failover protocol information needed to resend messages that were undelivered due to failure of one of the communication connections.

24 Claims, 5 Drawing Sheets

TRANSPARENT FAILOVER SUPPORT THROUGH PRAGMATICALLY TRUNCATED PROGRESS ENGINE AND REVERSED COMPLEMENTARY CONNECTION ESTABLISHMENT IN MULTIFABRIC MPI IMPLEMENTATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to message passing infrastructure implementations. More specifically, the invention relates to techniques for improving the performance of Message Passing Interface ("MPI") and similar message passing implementations in multifabric systems.

BACKGROUND

Many computational problems can be subdivided into independent or loosely-dependent tasks, which can be distributed among a group of processors or systems and executed in parallel. This technique often permits the main problem to be solved faster than would be possible if all the tasks were performed by a single processor or system. Sometimes, the processing time can be reduced proportionally to the number of processors or systems working on the sub-tasks.

Cooperating processors and systems can be coordinated as necessary by transmitting messages between them. Messages can also be used to distribute work and to collect results. Some partitions or decompositions of problems can place significant demands on a message passing infrastructure, either by sending and receiving a large number of messages, or by transferring large amounts of data within the messages.

Messages may be transferred from process to process over a number of different communication channels, or "fabrics." For example, processes executing on the same physical machine may be able to communicate efficiently using shared memory or point-to-point processor interconnections on multi-processor machines. Processes on different machines may communicate through a high-speed network such as InfiniBand® (a registered trademark of the InfiniBand Trade Association), Myrinet® (a registered trademark of Myricom, Inc. of Arcadia, Calif.), Scalable Coherent Interface ("SCI"), or QSNet by Quadrics, Ltd. of Bristol, United Kingdom. These networks may provide a native operational mode that exposes all of the features available from the fabric, as well as an emulation mode that permits the network to be used with legacy software. A commonly-provided emulation mode may be a Transmission Control Protocol/Internet Protocol ("TCP/IP") mode, in which the high-speed network is largely indistinguishable from a traditional network such as Ethernet. Emulation modes may not be able to transmit data as quickly as a native mode. Processes may also communicate via traditional networks such as Ethernet.

A standard set of message passing functions may be defined, and libraries provided to perform the standard functions over each type of fabric. One standard library definition is the Message Passing Interface ("MPI") from the members of the MPI Forum (see MPI: A Message-Passing Interface Standard Version 2.1, Message Passing Interface Forum, Jun. 23, 2008, available at www.mpi-forum.org#docs#, where "/" is replaced with "#" in the URL to avoid an active link from within this document). An MPI (or similar) library may provide the standard functions over one or more fabrics.

DETAILED DESCRIPTION

As previously mentioned, a standard set of message passing functions may be defined, and libraries provided to perform the standard functions over each type of fabric. These standard libraries prevent the varying operational requirements of different communication fabrics from causing extra complexity in message-passing applications. However, as the number of fabrics supported by a library increases, the message passing performance tends to decrease. Conversely, a library that supports only one or two fabrics may have better performance, but its applicability is limited. Techniques to improve the performance of a message passing infrastructure that supports many different communication fabrics may be of value in the field.

Embodiments of the present invention include a scheme to improve the performance of a message passing infrastructure that supports many different communication fabrics. These embodiments include a method, apparatus, system, and computer program product for transparently providing failover support in a multi-fabric communication environment between processes.

Figure 1:
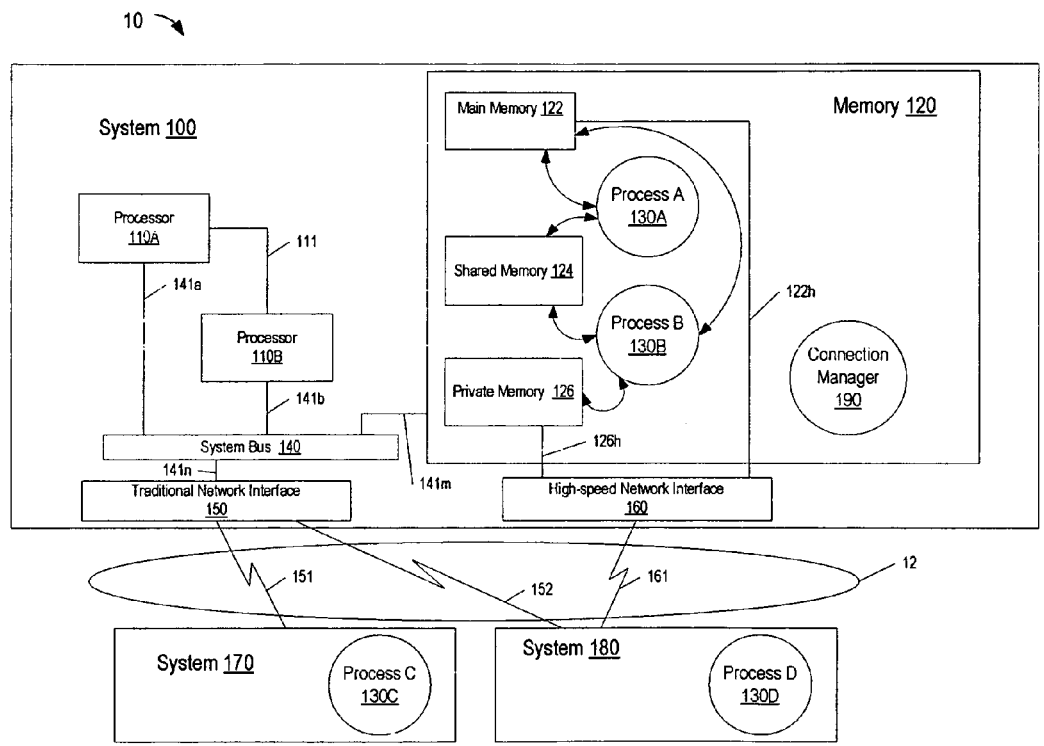
FIG. 1 is a block diagram depicting a suitable data processing environment in which certain aspects of an example embodiment of the present invention may be implemented.

FIG. 1 is a block diagram depicting a suitable data processing environment 10 in which certain aspects of an example embodiment of the present invention may be implemented. Data processing environment 10 includes a processing system 100 that includes one or more processors or central processing units (CPUs), shown here as processors 110A and 110B. One of skill in the art will recognize that, while two processors are shown, a single processor or any number of multiple processors may provide processor functionality to processing system 100. Each of processors 110A and 110B may be a single-core or a multi-core processor. Processors 110A and 110B are shown as communicatively coupled to various other components including a memory 120 via one or more system buses 140 or other communication pathways or mediums. Processors 110A and 110B are also shown as connected via a point-to-point processor interconnection 111, such as a HyperTransport link or an Intel QuickPath Interconnect (QPI).

For purposes of illustration, process A 130A is described herein as running on processor 110A, and process B 130B is described as running on processor 110B. A connection manager 190 manages communication connections between processes running on the various systems 100, 170, and 180 within data processing environment 10. Connection manager 190, as well as processes 130A and 130B, may be implemented as instructions executed by processor 110A and/or processor 110B within memory 120.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 100 may be controlled, at least in part, by input from conventional input devices, such as keyboards, mice, etc., and/or by directives received from another machine, biometric feedback, or other input sources or signals. Processing system 100 may utilize one or more connections to one or more remote data processing systems 170 and 180, such as through a network interface controller (NIC) such as traditional network interface 150 or high-speed network interface 160, a modem, or other communication ports or couplings. These various communication connections may be managed by communications manager 190. Processing systems 100, 170, and 180 may be interconnected by way of a physical and/or logical network 12, such as a local area network (LAN), a wide area network (WAN), an intranet, the Internet, etc. Communications involving network 12 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 100, processors 110A and 110B may be communicatively coupled to one or more volatile or non-volatile data storage devices, such as memory 120, main memory 122, shared memory 124, and private memory 126. Memory 120, main memory 122, shared memory 124, and private memory 126 may include random access memory (RAM), read-only memory (ROM), mass storage devices such as integrated drive electronics (IDE) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processors 110A and 110B may also be communicatively coupled to additional components, such as video controllers, small computer system interface (SCSI) controllers, network controllers, universal serial bus (USB) controllers, input devices such as a keyboard and mouse, etc. Processing system 100 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as a NIC for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

System 100 includes processors 110A and 110B and memory 120, which includes main memory 122, shared memory 124, and private memory 126. The separation of memory 120 into main memory 122, shared memory 124, and private memory 126 may be implemented as physically separate hardware memories, or a single memory may be virtually separated by an operating system or other software into process address spaces. In the embodiment illustrated, private memory 126 is a portion of memory 120 that is virtually separated so that it is accessible only to processor 110B and to process B 130B running on processor 110B; private memory 126 is not directly accessible by processor 110A or by process A 130A running on processor 110A. Processors 110A and 110B are connected to at least some portions of memory 120 via system bus 140 and interconnections 141a, 141b, and 141m. System bus 140 also provides access to a traditional network interface 150 via interconnection 141n.

Shared memory 124 is shared between process A 130A and process B 130B and may be a portion of main memory 122 to which access by different processes running on system 100 is coordinated. Access to shared memory 124 may be controlled using inter-process communication, where one process creates an area in RAM that other processes can access, or by directing accesses to what would ordinarily be copies of a piece of data to a single instance by using virtual memory mappings. The coordinated access to shared memory 124 is provided by resources (not shown) running on system 100, such as an operating system and/or virtualization software.

Processes running on system 100 (including process A 130A and process B 130B) may communicate with processes running on system 170 (such as process C 130C) and processes running on system 180 (such as process D 130D) via traditional network interface 150 and respective network connections 151 and 152, which provide traditional network connectivity, such as Ethernet network connectivity.

Processes running on system 100 may also communicate with processes running on system 180 (such as process D 130D) via high-speed network interface 160 and high-speed network connection 161, which provides high-speed network connectivity, such as InfiniBand connectivity. In the embodiment shown, high-speed network interface 160 is connected within system 100 to main memory 122 via connection 122h but not to shared memory 124. This configuration enables remote processes such as process D 130D of system 180 to communicate via high-speed network connection 161 with process A 130A or process B 130B of system 100. This communication may occur using Direct Access Programming Libraries (DAPL) for high-speed network message passing.

DAPL libraries include Remote Direct Memory Access (RDMA) libraries. An RDMA library connection allows computers in a network to exchange data in main memory without involving the processor, cache, or operating system of either computer. RDMA libraries improve throughput and performance because they free resources. RDMA also facilitates a faster data transfer rate. RDMA implements a transport protocol in the network interface card (NIC) hardware, such as high-speed network interface 160, and supports a feature called zero-copy networking. Zero-copy networking makes it possible to read data directly from the main memory of one computer and write that data directly to the main memory of the other computer. In the example shown in FIG. 1, zero-copy networking could be used to read data from main memory 122 and write that data directly to a main memory (not shown) for system 180.

Similarly, zero-copy networking could be used to read data from private memory 126 accessible only to processor 110B and process B 130B on system 100 and make that data available via connection 126h and high-speed network interface 160 to main memory 122 via connection 122h for access by process A 130A running on processor 110A.

Figure 2:
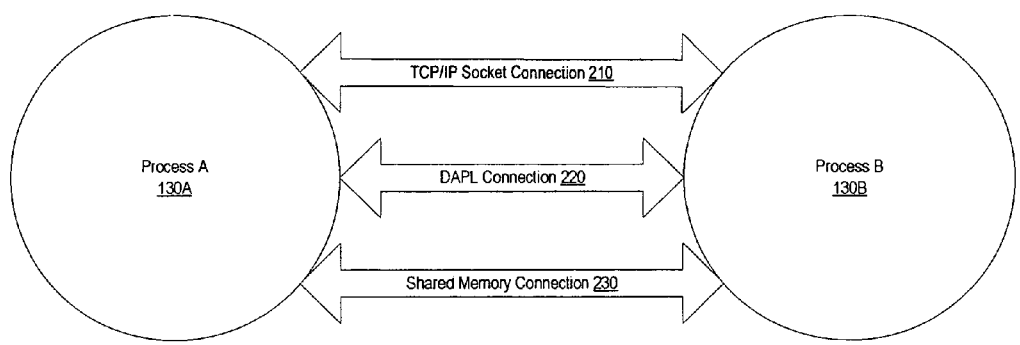
FIG. 2 illustrates establishment of multiple connections between two processes using different communication fabrics in accordance with one embodiment of the present invention.

FIG. 2 illustrates establishment of multiple connections between two processes using different communication fabrics in accordance with one embodiment of the present invention. Communications manager 190 of FIG. 1 may establish and manage these multiple connections between two processes. These multiple connections are established upon a request to establish a communication session between process A 130A and process B 130B of FIG. 1, such as when either process A 130A or process B 130B calls an MPI library routine MPI_Init to initialize communication with the other process. In accordance with one embodiment of the present invention, these multiple connections are established in accordance with an order. This order may take into account the reliability of the communication fabrics. For example, the most reliable connection may be established first. In this example, the most reliable connection is TCP/IP socket connection 210, which is established first.

Even though process A 130A and process B 130B reside on the same network node 100 in FIG. 1, TCP/IP socket connection 210 may be established using a TCP/IP loopback device, which is a virtual network interface implemented in software only and not connected to any hardware, but which is fully integrated into the data processing system's internal network infrastructure. TCP/IP socket connection 210 may be established, for example, using system memory and the system bus to provide a socket connection between processes. Messages sent by either process A 130A or B 130B will be immediately received on the TCP/IP loopback device virtual network interface and made available to the other process.

The next connection in accordance with the order may then be established, which in FIG. 2 is Direct Access Programming Library (DAPL) connection 220. A DAPL connection may be established via a traditional network using an interface such as traditional network interface 150 and a DAPL protocol such as Intel Direct Ethernet Transport (DET). Alternatively, a DAPL connection may be established via a high-speed network using an interface such as high-speed network interface 160. In the example shown in FIG. 1, DAPL connection 220 may be established via high-speed network interface 160 to enable data to be read from processor B memory 126 via connection 126h and written directly to main memory 122 via connection 122h. Alternatively, data may be read from main memory 122 via connection 122h and written to private memory 126 via connection 126h. DAPL connection 220 would be established by the initiating process A 130A or process B 130B calling an DAPL library command to establish a connection with the other process. One port on high speed network interface 160 may be used to establish bi-directional communication between the processes, or two ports on high speed network interface 160 may be used to establish a connection.

After establishment of a DAPL connection 220, the fastest connection, shared memory connection 230, is established. Shared memory connection 230 is an example of a direct connection between processes that does not require use of a network interface. A shared memory connection requires that the processes be running on the same system (although perhaps on different processors within the system). If a shared memory is available to the processes, then a shared memory connection is established in addition to the other connections established via the system 100 network interfaces 150 and 160 and/or virtual network interface provided by a TCP/IP loopback device. In one embodiment, the shared memory connection is placed last in the order so that it is established after all of the connections have been established via network interfaces.

Shared memory such as shared memory 124 of FIG. 1 may be implemented using inter-process communication, where one process creates an area in RAM that other processes can access, or by directing accesses to what would ordinarily be copies of a piece of data to a single instance by using virtual memory mappings. Shared memory connection 230 would be established using shared memory primitives to establish inter-process communication or to establish virtual memory mappings.

Once multiple connections are established between the processes, a pragmatically truncated progress engine may be used to control message flow between the processes. Such a progress engine may be a component within connection manager 190. The progress engine may use a fastest available connection for communication of messages and/or a combined virtual heterogeneous communication channel using a combination of communication fabrics for communication of different portions of a message. Messages may also be sent in parallel via multiple communication connections. This progress engine and communication control are described in U.S. patent application Ser. No. 11/261,998, Publication No. 20070097952, entitled "Method and Apparatus for Dynamic Optimization of Connection Establishment and Message Progress Processing in a Multifabric MPI Implementation;" U.S. patent application Ser. No. 11/528,201, Publication No. 20080077916, entitled "Method and Apparatus Virtual Heterogeneous Channel for Message Passing;" and U.S. patent application Ser. No. 11/027,194, Publication No. 20060146715, entitled "Method, System and Apparatus for Multifabric Pragmatically Truncated Progress Execution," all of which are assigned to the assignee of the present invention and incorporated by reference herein in their entirety.

Figure 3:
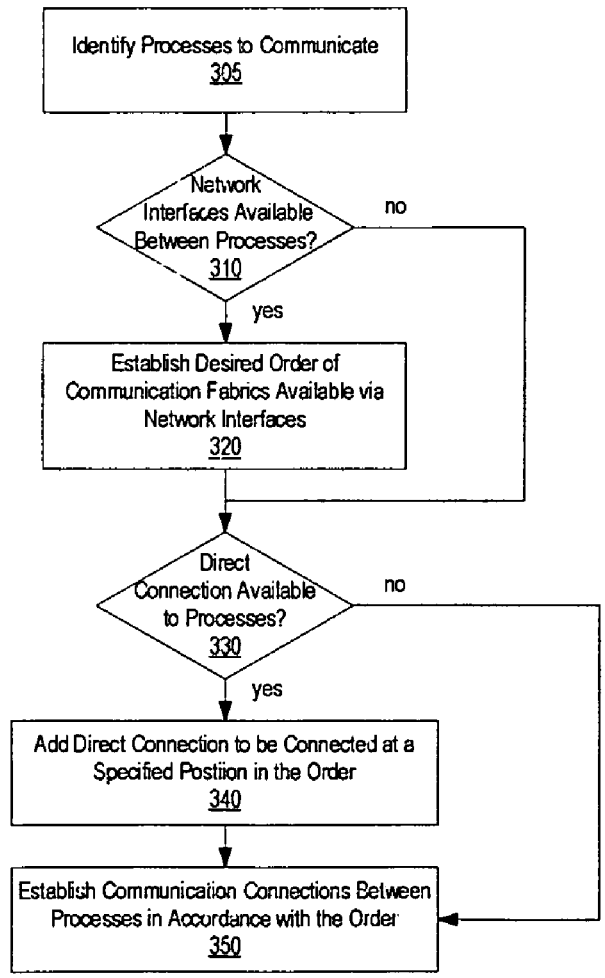
FIG. 3 is a flowchart of a process for establishing the connections shown in FIG. 2.

FIG. 3 is a flowchart of a process for establishing multiple connections between two processes. At "Identify Processes to Communicate" step 505, processes desiring to communicate are identified. At "Network Interfaces Available Between Processes?" decision point 310, a determination is made whether the processes to be connected for communication have network interfaces available for establishing a network connection. These network interfaces may include physical network interfaces such as traditional network interface 150 and high-speed network interface 160, as well as virtual network interfaces provided, for example, as a TCP/IP loopback device. If network interfaces are available, control proceeds to "Establish Desired Order of Communication Fabrics Available via Network Interfaces" step 320. A desired order of communication fabrics may be established to reflect reliability of the communication fabrics, speed of the communication fabrics, or other factors related to quality of service for the inter-process communication. Control then proceeds to "Direct Connection Available to Processes" decision point 330.

At "Network Interfaces Available Between Processes?" decision point 310, if network interfaces are not available, control proceeds to "Direct Connection Available to Processes" decision point 330 to determine whether another mechanism for inter-process communication is available.

At "Direct Connection Available to Processes" decision point 330, if a direct connection is available to the processes to be connected for communication, such as shared memory or a point-to-point processor interconnection between the processors, control proceeds to "Add Direct Connection to be Connected at a Specified Position in the Order" step 340. For example, because a direct connection is generally the fastest possible connection between two processes, it is desirable to ensure that a direct connection is established in addition to connections made over communication fabrics available via the network interfaces. In accordance with one embodiment of the invention, the direct connection may be established last, after all of the other possible network connections have been established. In accordance with another embodiment of the invention, the direct connection is established first.

After the direct connection has been added to the order in which the communication connections are to be established at "Add Direct Connection to be Connected at a Specified Position in the Order" step 340, or a determination has been made that a direct connection is not available to the processes at "Direct Connection Available to Processes" decision point 330, control proceeds to "Establish Communication Connections Between Processes in Accordance with the Order" step 350.

At "Establish Communication Connections Between Processes in Accordance with the Order" step 350, multiple communication connections are established between the processes in accordance with the order determined in the previous steps. These multiple connections are maintained for the duration of a communication session between the processes.

This novel connection strategy is in contrast to standard practice, where the fastest possible connection between two processes is established first, and no attempt to establish slower connections is made until the fastest connection either cannot be established or fails. Often, an attempt will be made first to re-establish the fastest possible connection upon failure, which adds time to handle the failover event. The present invention circumvents the need to re-establish the connection because all available types of communication connections are established initially and maintained. By maintaining all connections for the duration of the communication session between processes, failover can be established immediately and messages that were undelivered via the failed connection can be immediately resent via one of the other pre-established connections.

Figure 4:
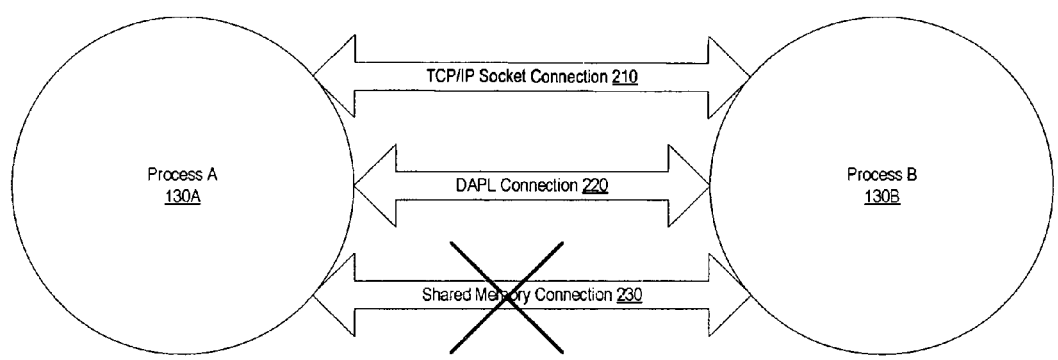
FIG. 4 illustrates failure of one of the connections established in FIG. 2.

FIG. 4 illustrates failure of one of the connections established in FIG. 2. In this example, shared memory connection 230 has failed. For example, another process providing interprocess communication mechanisms may fail, or a process providing virtual memory mappings may fail. Multiple connections between process A 130A and process B 130B are maintained for the duration of the communication session between them; consequently, when one of the connections fails, another one of the already-established connections can be used to resend messages between process A 130A and process B 130B. In one embodiment, an alternative connection is selected by identifying the fastest connection fabric that is available and the fastest available fabric is then used to send protocol messages to communicate the failover attempt. For example, when shared memory connection 230 fails, the fastest available connection is DAPL connection 220. Failover of communication between process A 130A and process B 130B can be transparently established, as no lead time is necessary to establish the failover connection. Failover protocol messages can be immediately sent via DAPL connection 220 and any messages that were undelivered via shared memory connection 230 can be resent using DAPL connection 220.

In another embodiment, an alternative strategy for selecting a failover fabric may be used. For example, a most reliable available connection may be selected to communicate the failover attempt and re-establish communication between process A 130A and process B 130B. In this example, TCP/IP socket connection 210 is considered to be the most reliable available connection, and failover protocol messages may be immediately sent via TCP/IP socket connection 210.

Figure 5:
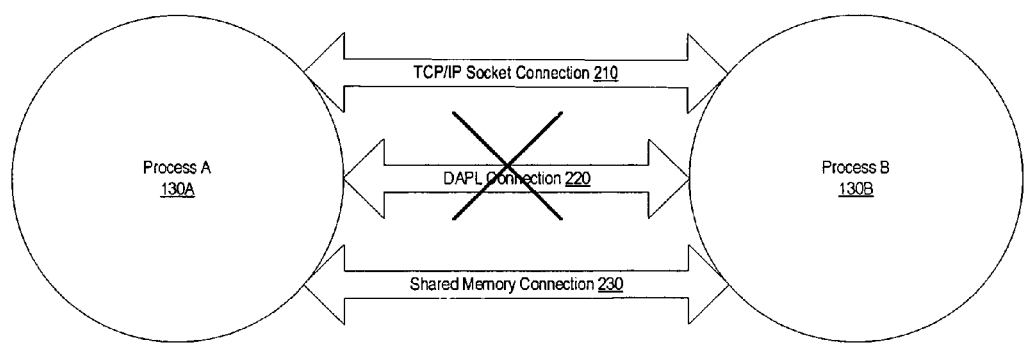
FIG. 5 illustrates failure of a different one of the connections established in FIG. 2.

FIG. 5 illustrates failure of a different one of the connections established in FIG. 2. In this example, DAPL connection 220 has failed. For example, an InfiniBand connection may be broken between two processes due to a faulty wire. An alternative connection may be selected by identifying the most reliable connection fabric that is available and the most reliable available fabric can then be used to send protocol messages to communicate the failover attempt. In this example, TCP/IP socket connection 210 remains available and may be considered more reliable than shared memory connection 230. Failover protocol messages can be immediately sent via TCP/IP socket connection 210 and any messages that were undelivered via DAPL connection 220 can be resent using TCP/IP socket connection 210.

In accordance with one embodiment of the invention, a slowest or most reliable connection is established first between two processes, and this connection is maintained throughout the duration of a communication session between the processes. This slowest, most reliable connection is then complemented by progressively faster connections between the same pair of processes, each of which is also maintained throughout the duration of the communication session between the processes. Both network connections and direct connections via shared memory and/or point-to-point processor interconnections may be established. This connection strategy provides one or more failback communication paths that can be used with no startup costs in the event of failure of one of the other communication paths. These failback communication paths can be used to exchange failover protocol information needed to resend messages that were undelivered due to failure of one of the communication connections.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and nonvolatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing reliable communication between two processes in a multifabric message passing interface infrastructure. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method performed by a connection manager executed by a processor, the method comprising:
    establishing a plurality of connections between a first process and a second process:
        wherein each connection of the plurality of connections is connected via a different type of communication fabric of a plurality of types of communication fabrics;
        wherein the operation of establishing the plurality of connections comprises establishing the plurality of connections in an order that (a) starts with a first connection using a connection type that is slowest, and that then (b) proceeds with one or more subsequent connections using connection types that are progressively faster; and
        wherein the first connection comprises a packet based connection, and at least one of the subsequent connections comprises a direct connection;
    after establishing the direct connection, using the direct connection to share data between the first process and the second process;
    maintaining the packet based connection while using the direct connection to share data between the first process and the second process;
    after using the direct connection to share data between the first process and the second process, determining that the direct connection has failed; and
    in response to determining that the direct connection has failed, using the packet based connection to re-share at least some of the data between the first process and the second process;
    wherein the operation of maintaining the packet based connection while using the direct connection enables data to be re-shared via the packet based connection without re-establishing the packet based connection.

2. The method of claim 1 wherein the first connection comprises a Transmission Control Protocol/Internet Protocol (TCP/IP) connection.

3. The method of claim 1 wherein
    the direct connection comprises one of a shared memory connection and a point-to-point processor interconnection.

4. The method of claim 1 wherein
    the operation of establishing the plurality of connections comprises establishing connections in decreasing order of reliability.

5. The method of claim 1, further comprising:
    maintaining the plurality of connections for a duration of a communication session between the first process and the second process.

6. The method of claim 5 wherein:
    the operation of establishing the plurality of connections is performed in response to an initialization of a communication session between the first process and the second process; and
    the operation of maintaining the plurality of connections for the duration of the communication session comprises maintaining the plurality of connections until the communication session is exited.

7. The method of claim 1 wherein,
    upon failure of a connection currently in use, a replacement connection is selected from the plurality of connections in decreasing order of connection speed.

8. The method of claim 1 wherein, upon failure of a connection currently in use, a replacement connection is selected from the plurality of connections in increasing order of connection reliability.

9. A system comprising:
    at least one processor; and
    a memory comprising instructions for a connection manager, wherein the connection manager performs operations comprising:
        establishing a plurality of connections between a first process and a second process:
            wherein each connection of the plurality of types of connections is connected via a different communication fabric of a plurality of types of communication fabrics;
            wherein the operation of establishing the plurality of connections comprises establishing the plurality of connections in an order that (a) starts with a first connection using a connection type that is slowest, and that then (b) proceeds with one or more subsequent connections using connection types that are progressively faster; and
            wherein the first connection comprises a packet based connection, and at least one of the subsequent connections comprises a direct connection;
        after establishing the direct connection, using the direct connection to share data between the first process and the second process;
        maintaining the packet based connection while using the direct connection to share data between the first process and the second process;
        after using the direct connection to share data between the first process and the second process, determining that the direct connection has failed; and
        in response to determining that the direct connection has failed, using the packet based connection to re-share at least some of the data between the first process and the second process;

wherein the operation of maintaining the packet based connection while using the direct connection enables data to be re-shared via the packet based connection without re-establishing the packet based connection.

10. The system of claim 9 wherein the first connection comprises a Transmission Control Protocol/Internet Protocol (TCP/IP) connection.

11. The system of claim 9 wherein
the direct connection comprises one of a shared memory connection and a point-to-point processor interconnection.

12. The system of claim 9 wherein
the operation of establishing the plurality of connections in accordance with the order comprises establishing a first connection associated with a most reliable type of communication fabric of the plurality of types of communication fabrics first.

13. The system of claim 9 wherein
the establishing the plurality of connections comprises establishing connections in decreasing order of reliability.

14. The system of claim 13 wherein
the operation of establishing the plurality of connections is performed in response to an initialization of a communication session between the first process and the second process; and
the operation of maintaining the plurality of connections for the duration of the communication session comprises maintaining the plurality of connections until the communication session is exited.

15. The system of claim 9 wherein,
upon failure of a connection currently in use, a replacement connection is selected from the plurality of connections in decreasing order of connection speed.

16. The system of claim 9 wherein,
upon failure of a connection currently in use, a replacement connection is selected from the plurality of connections in increasing order of connection reliability.

17. A computer program product comprising:
a non-transitory computer-readable storage medium; and
instructions in the non-transitory computer-readable storage medium, wherein the instructions, when executed in a processing system, cause the processing system to perform operations comprising:
  establishing a plurality of connections between a first process and a second process:
    wherein each connection of the plurality of types of connections is connected via a different communication fabric of a plurality of types of communication fabrics; and
    wherein the operation of establishing the plurality of connections comprises establishing the plurality of connections in an order that (a) starts with a first connection using a connection type that is slowest, and that then (b) proceeds with one or more subsequent connections using connection types that are progressively faster; and
  wherein the first connection comprises a packet based connection, and at least one of the subsequent connections comprises a direct connection;
  after establishing the direct connection, using the direct connection to share data between the first process and the second process;
  maintaining the packet based connection while using the direct connection to share data between the first process and the second process;
  after using the direct connection to share data between the first process and the second process, determining that the direct connection has failed; and
  in response to determining that the direct connection has failed, using the packet based connection to re-share at least some of the data between the first process and the second process;
  wherein the operation of maintaining the packet based connection while using the direct connection enables data to be re-shared via the packet based connection without re-establishing the packet based connection.

18. The computer program product of claim 17 wherein the first connection comprises a Transmission Control Protocol/Internet Protocol (TCP/IP) connection.

19. The computer program product of claim 17 wherein
the direct connection comprises one of a shared memory connection and a point-to-point processor interconnection.

20. The computer program product of claim 17 wherein
the operation of establishing the plurality of connections in accordance with the order comprises establishing a first connection associated with a most reliable type of communication fabric of the plurality of types of communication fabrics first.

21. The computer program product of claim 17 wherein
the establishing the plurality of connections comprises establishing connections in decreasing order of reliability.

22. The computer program product of claim 21 wherein
the operation of establishing the plurality of connections is performed in response to an initialization of a communication session between the first process and the second process; and
the operation of maintaining the plurality of connections for the duration of the communication session comprises maintaining the plurality of connections until the communication session is exited.

23. The computer program product of claim 17 wherein,
upon failure of a connection currently in use, a replacement connection is selected from the plurality of connections in decreasing order of connection speed.

24. The computer program product of claim 17 wherein,
upon failure of a connection currently in use, a replacement connection is selected from the plurality of connections in increasing order of connection reliability.

* * * * *

UNITED STATES PATENT AND TRADEMARK OFFICE
CERTIFICATE OF CORRECTION

| | |
|---|---|
| PATENT NO. | : 8,305,883 B2 |
| APPLICATION NO. | : 12/383237 |
| DATED | : November 6, 2012 |
| INVENTOR(S) | : Alexander V. Supalov |

It is certified that error appears in the above-identified patent and that said Letters Patent is hereby corrected as shown below:

On sheet 3 of 5, in Figure 3, Ref. numeral 340, line 2, delete "Postiion" and insert -- Position --, therefor.

In column 9, line 41, in claim 1, after "wherein" delete "the operation of".

In column 9, line 64, in claim 1, after "wherein" delete "the operation of".

In column 10, line 9, in claim 4, before "establishing" delete "the operation of".

In column 10, line 18, in claim 6, before "establishing" delete "the operation of".

In column 10, line 22, in claim 6, before "maintaining" delete "the operation of".

Signed and Sealed this
Twenty-sixth Day of February, 2013

Teresa Stanek Rea
*Acting Director of the United States Patent and Trademark Office*